(12) United States Patent
Suetsugu (10) Patent No.: US 12,346,959 B2
(45) Date of Patent: Jul. 1, 2025

(54) DISPLAY SYSTEM AND COMPUTER PROGRAM PRODUCT

(71) Applicant: Katsunori Suetsugu, Tokyo (JP)

(72) Inventor: Katsunori Suetsugu, Tokyo (JP)

( * ) Notice: Subject to any disclaimer, the term of this patent is extended or adjusted under 35 U.S.C. 154(b) by 278 days.

(21) Appl. No.: 17/654,848

(22) Filed: Mar. 15, 2022

(65) Prior Publication Data

US 2022/0318891 A1 Oct. 6, 2022

(30) Foreign Application Priority Data

Mar. 31, 2021 (JP) .................................. 2021-61203

(51) Int. Cl.
 *G06Q 30/00* (2023.01)
 *G06Q 30/0601* (2023.01)
 *G06T 19/20* (2011.01)

(52) U.S. Cl.
 CPC ......... *G06Q 30/0643* (2013.01); *G06T 19/20* (2013.01); *G06T 2210/16* (2013.01); *G06T 2219/2012* (2013.01)

(58) Field of Classification Search
 None
 See application file for complete search history.

(56) References Cited

U.S. PATENT DOCUMENTS

2009/0138377 A1* 5/2009 Oh ..................... G06Q 30/0601
   705/26.1
2009/0144173 A1* 6/2009 Mo ....................... G06N 3/006
   700/98

(Continued)

FOREIGN PATENT DOCUMENTS

JP 2002099840 A 4/2002
JP 2002183542 A 6/2002
JP 2008165807 A 7/2008

OTHER PUBLICATIONS

Minar MR, Ahn H., Cloth-vton: Clothing three-dimensional reconstruction for hybrid image-based virtual try-on, 2020, In Proceedings of the Asian conference on computer vision 2020. (Year: 2020).*

(Continued)

*Primary Examiner* — Kelly S. Campen
*Assistant Examiner* — Brittany E Bargeon
(74) *Attorney, Agent, or Firm* — Rosenberg, Klein & Lee (57) ABSTRACT

Provided is a display system and computer program product that are able to process a three-dimensional shape of a state in which a mannequin is wearing clothes, into an appearance desired by a user and to display the processed three-dimensional shape.

A display system for selling clothes includes a wearing 3D generator that generates wearing 3D data representing a three-dimensional shape of a state in which a mannequin is wearing clothes by combining mannequin 3D data representing the mannequin in a three-dimensional shape using computer graphics and clothes 3D data representing the clothes in three-dimensional shapes using computer graphics and a display unit that displays the three-dimensional shape of the state in which the mannequin is wearing the clothes, on the basis of the wearing 3D data. The wearing 3D generator processes a portion specified by a user of the three-dimensional shape of the state in which the mannequin is wearing the clothes, into a specified form.

10 Claims, 3 Drawing Sheets

(56) References Cited

U.S. PATENT DOCUMENTS

| | | | | |
|---|---|---|---|---|
| 2015/0235305 | A1* | 8/2015 | Reed | A41H 3/007 |
| | | | | 705/27.2 |
| 2016/0180433 | A1* | 6/2016 | Adeyoola | G06F 3/04845 |
| | | | | 705/26.62 |
| 2017/0132837 | A1* | 5/2017 | Iverson | G06T 17/10 |
| 2021/0248669 | A1* | 8/2021 | Wade | G06N 20/00 |

OTHER PUBLICATIONS

Kang, H. and Lee, S., Shape-simplifying image abstraction, Oct. 2008, In Computer Graphics Forum, Oxford, UK: Blackwell Publishing Ltd., vol. 27, No. 7, pp. 1773-1780. (Year: 2008).*

Official Action Issued By Foreign Patent Office in Application No. 2021-061203.

* cited by examiner

DISPLAY SYSTEM AND COMPUTER PROGRAM PRODUCT

TECHNICAL FIELD

The present invention relates to a display system and computer program product that display a three-dimensional shape of a state in which a mannequin is wearing clothes.

BACKGROUND ART

Users have had a need to check whether clothes fit their body shape without actually trying on the clothes when purchasing the clothes at a real store or on the Internet. Users also have had a need to check whether they are wearing clothes well by checking a state in which the users trying on the clothes are taking various poses, from the front, rear, left, and right.

To satisfy these needs, technologies have existed that display a three-dimensional image of a mannequin on a display or the like installed in a user terminal or real store as if the user were wearing clothes (for example, see Japanese Unexamined Patent Application Publication No. 2002-183542).

Showing the mannequin as if the mannequin were the user allows the user to grasp a state in which the user is wearing the clothes and helps when the user purchases the clothes. However, if the body shape of a mannequin selected to be clothed is close to that of the user but if the face of the mannequin is significantly different from the face of the user, the user would have difficulty in determining whether the clothes being worn by the mannequin become the user.

Technologies also have existed that display an image in which a face picture of a user is combined with the body of a mannequin (for example, see Japanese Unexamined Patent Application Publication No. 2002-183542). However, the mannequin may look like the real user. That is, when using such an image to purchase fashion goods or clothes, the user may disadvantageously have an eerie impression due to the image being too real.

Users also have had a need to check whether they are wearing clothes well, for example, in a state in which they have put on their makeup, or sunburned themselves, or reduced their weight in accordance with various situations or an expected change in the body shape or the like of the user.

As related art, Japanese Unexamined Patent Application Publication No. 2002-183542 describes a virtual try-on system that handles three-dimensional images of items such as clothes and a three-dimensional image of a mannequin, displays the mannequin trying on the items in a rotated or inverted manner, displays a face picture on the face of the mannequin by performing 3D-CG texture mapping, and allows the user to order a selected item online.

Japanese Unexamined Patent Application Publication No. 2008-165807 discloses a technology that forms a 3D try-on model by pasting a makeup layer on a 3D body model on the basis of an operation command of a user.

Japanese Unexamined Patent Application Publication No. 2002-99840 discloses a technology that receives input of a face picture of a user when the user is registered as a member and replaces the head of a mannequin with the face picture of the registered member.

See Japanese Unexamined Patent Application Publication Nos. 2002-183542, 2002-183542, 2008-165807, and 2002-99840.

SUMMARY OF INVENTION

An object of the present invention is to provide a display system and computer program product that are able to process a three-dimensional shape of a state in which a mannequin is wearing clothes, into an appearance desired by a user and to display the processed three-dimensional shape.

Another object of the present invention is to provide a display system and computer program product that even if a user does not actually try on clothes, display a state as if the user were wearing the clothes and thus allow the user to check whether the user is wearing the clothes well.

Yet another object of the present invention is to provide a display system and computer program product that are able to prevent a mannequin used for try-on from looking like a real human.

Still yet another object of the present invention is to provide a display system and computer program product that, even if a user is not present in a predetermined situation, allows the user to check whether the user is wearing clothes well in the predetermined situation.

To accomplish the above objects, the present invention provides a display system for selling clothes. The display system includes a wearing 3D generator that generates wearing 3D data representing a three-dimensional shape of a state in which a mannequin is wearing clothes by combining mannequin 3D data representing the mannequin in a three-dimensional shape using computer graphics and clothes 3D data representing the clothes in three-dimensional shapes using computer graphics and a display unit that displays the three-dimensional shape of the state in which the mannequin is wearing the clothes, on the basis of the wearing 3D data. The wearing 3D generator processes a portion specified by a user of the three-dimensional shape of the state in which the mannequin is wearing the clothes, into a specified form.

According to this invention, the wearing 3D generator processes the portion specified by the user of the three-dimensional shape of the state in which the mannequin is wearing the clothes, into the specified appearance and thus is able to display the three-dimensional shape whose portion has been processed into the appearance desired by the user and that represents the state in which the mannequin is wearing the clothes.

In the display system, the wearing 3D generator generates the wearing 3D data by replacing a face of the mannequin with a face of the user.

According to this invention, even if the user does not actually try on the clothes, the display system is able to display the three-dimensional shape as if the user were trying on the clothes, allowing the user to check if the user is wearing the clothes well.

In the display system, the wearing 3D generator performs, as a processing process, at least one of a process of blurring at least a portion of the three-dimensional shape of the state in which the mannequin is wearing the clothes, a process of changing at least one of skin color, hair color, eyebrow color, and eye color, a process of adjusting thickness of makeup of a face, a process of adjusting the level of skin tension, and a process of changing a facial expression in accordance with specification of the user.

According to this invention, the wearing 3D generator is able to display the three-dimensional shape whose portion has been processed into the appearance desired by the user and that represents the state in which the mannequin is wearing the clothes. Also, performing a blurring process reduces reality and prevents the mannequin from looking like a real human and thus giving an eerie impression.

In the display system, image data representing the face of the user is inputted when the user is registered or authenticated.

According to this invention, when the user uses the system, the user inputs their face image. This prevents the user from forgetting inputting the face image and improves security.

In the display system, the display system further includes a background combination unit that generates background combined data used to display a background combined image in which a background is combined with the three-dimensional shape of the state in which the mannequin is wearing the clothes, and the display unit displays the background combined image on the basis of the background combined data generated by the background combination unit.

According to this invention, even if the user is not present in a predetermined situation, the user is able to check if the user is wearing the clothes well in the predetermined situation.

In the display system, the background combination unit combines at least one of a background in which an animal is displayed, a background in which a human is displayed, a background representing a scene, and a background representing a season in accordance with specification of the user.

According to this invention, the user is able to check whether the user is the wearing clothes well in various situations.

In the display system, the background combination unit combines a background representing a scene that has been determined to have a predetermined level of matching by AI with the three-dimensional shape of the state in which the mannequin is wearing the clothes.

According to this invention, the background is displayed automatically. Thus, a situation suitable for the predetermined clothes is checked.

The present invention provides a computer program product for causing a computer to function as wearing 3D generation means configured to generate wearing 3D data representing a three-dimensional shape of a state in which a mannequin is wearing clothes by combining mannequin 3D data representing the mannequin in a three-dimensional shape using computer graphics and clothes 3D data representing the clothes in three-dimensional shapes using computer graphics and display means configured to display the three-dimensional shape of the state in which the mannequin is wearing the clothes, on the basis of the wearing 3D data. The wearing 3D generation means processes a portion specified by a user of the three-dimensional shape of the state in which the mannequin is wearing the clothes, into a specified form.

According to this invention, the three-dimensional shape whose portion has been processed into the appearance desired by the user and that represents the state in which the mannequin is wearing the clothes is displayed.

DESCRIPTION OF EMBODIMENTS

Now, an embodiment of the present invention will be described in detail with reference to the drawings.

Figure 1:
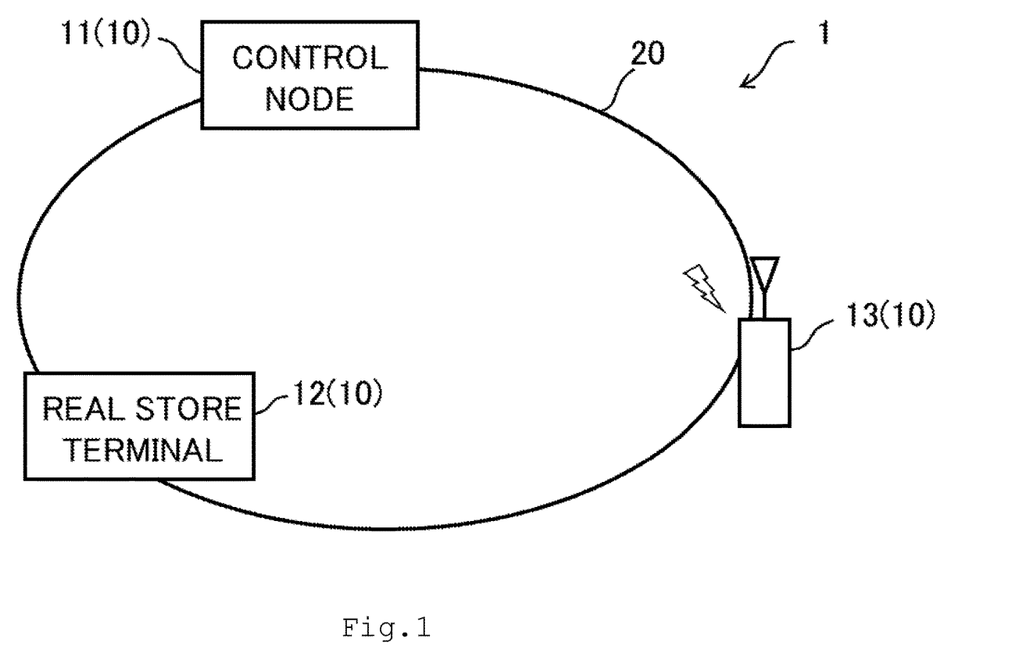
FIG. 1 is a diagram showing the overall configuration of a display system according to an embodiment of the present invention.

FIG. 1 is a diagram showing the overall configuration of a display system 1 according to the embodiment of the present invention. As shown in FIG. 1, a display system 1 includes multiple nodes 10 forming a blockchain network 20. The nodes 10 include a control node 11 that controls the display system 1 and forms and displays a three-dimensional shape of a state in which a mannequin is wearing clothes, a real store terminal 12 installed in a real store that sells clothes, and a user terminal 13 owned by a user who uses EC sites on the Internet. The nodes 10 are configured to be able to communicate with each other through the blockchain network 20. The real store terminal 12 is, for example, a communication terminal such as a PC or monitor device, and the user terminal 13 is, for example, a communication terminal such as a PC or portable information terminal. Note that while FIG. 1 shows a single real store terminal 12 and a single user terminal 13, they are actually present in multiple numbers.

The "clothes" here include all clothes that mannequins can wear, such as hats, glasses, masks, earphones, bags, rings, accessories, shoes, mufflers, scarfs, gloves, belts, and wallets.

Figure 2:
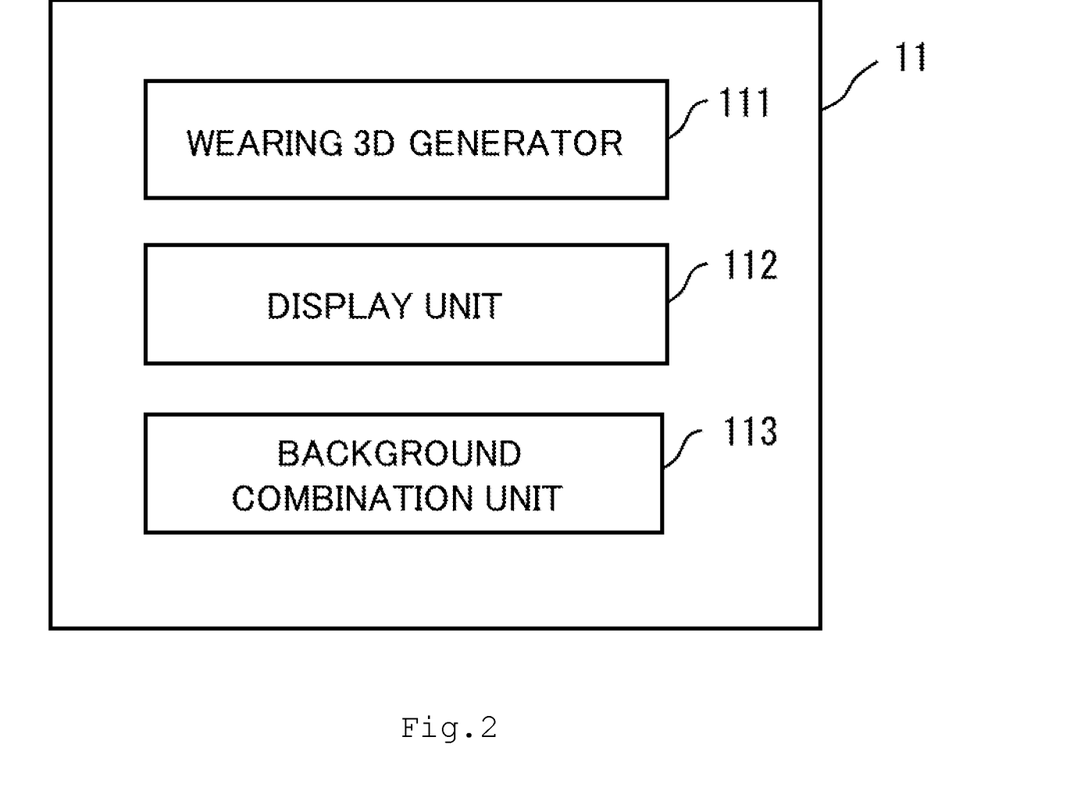
FIG. 2 is a diagram showing the functional elements of a control node of the display system according to the embodiment.

The control node 11 is a computer having a communication function and includes, as hardware, a CPU, a storage device including RAM, ROM, and hard disk, a communication interface that controls communication through the blockchain network 20, and input/output interfaces such as a keyboard and a display. Various types of data and software such as programs are stored in the storage device of the control node 11. Examples of the data stored in the storage device of the control node 11 include previously generated and stored data on three-dimensional shapes of mannequins having various shapes, previously inputted data on clothes being sold at real stores or EC sites and physical properties of the clothes, data on face images of users inputted when the users are registered in the display system 1 as members or authenticated, and the use histories and action histories of the users who use the display system 1. Examples of the programs stored in the storage device of the control node 11 include a program for representing a mannequin and clothes in a three-dimensional shape using computer graphics, a program for forming a three-dimensional shape of a state in which a mannequin is wearing clothes by combining a three-dimensional shape of the mannequin and three-dimensional shapes of the clothes and displaying the formed three-dimensional shape, a program determining which mannequin should be used among previously stored multiple mannequins, a program for processing a three-dimensional shape of a state in which a mannequin is wearing clothes, in accordance with specification of a user, and a program for combining a background. When the CPU of the control node 11 performs processing in accordance with the software stored in the storage device, functional elements shown in FIG. 2 are implemented on the control node 11.

A wearing 3D generator 111 generates wearing 3D data representing a three-dimensional shape of a state in which a mannequin is wearing clothes by combining mannequin 3D data representing a mannequin in a three-dimensional shape using computer graphics and clothes 3D data representing clothes in three-dimensional shapes using computer graphics. The wearing 3D data generated here may be data to be displayed in a VR environment or AR environment or data to be displayed as a 3D hologram.

The wearing 3D generator 111 also processes a portion specified by the user of the three-dimensional shape of the state in which the mannequin is wearing the clothes, into a specified form. The user may specify the portion to be processed and the appearance after the mannequin wearing the clothes is displayed on the display of the user terminal 13, or previously specify those before the mannequin wearing the clothes is displayed on the display.

Specifically, for example, when the user specifies replacement of the face of a mannequin to be used for try-on with the face of the user, the wearing 3D generator 111 replaces the face of the mannequin with the face of the user. In the present embodiment, image data representing the face of the user is inputted when the user is registered as a member for using the display system 1 or authenticated.

Examples of processing processes other than the replacement of the face performed by the wearing 3D generator 111 in accordance with specification of the user include a process of blurring at least a portion of the three-dimensional shape of the state in which the mannequin is wearing the clothes, a process of changing the skin color, hair color, eyebrow color, eye color, or the like, a process of adjusting the thickness of makeup of the face, a process of adjusting the level of skin tension, and a process of changing the facial expression.

The portion to be subjected to the blurring process may be the body or clothes. When blurring the body, the entire body may be blurred, or only particular portions of the body, such as finger tips or toe tips, may be blurred. Also, the body or clothes may be partially hidden. The hiding method may be hiding in black or white, or may be hiding by a cloth or wood.

The blurring technique may be any known one. With respect to the blurring process, it is preferable to allow the user to adjust the level using a parameter such as abstraction level 0, 1, 2, 3, or the like so that, for example, the representation of a face in a painting is gradually changed from realistic to abstract. The abstraction level set by default may be further adjusted in accordance with a user preference or by AI. When performing the blurring process, it is preferable to make an expression that does not give a feeling of strangeness by faithfully reproducing the color, mood, or the like while blurring the user's face or the like. Performing such a blurring process prevents the face of the user or the human image from appearing to be too real and thus giving an eerie impression.

With respect to the skin color change process, it is preferable to allow the user to make a selection using a parameter (for example, level 1, 2, or the like) as to whether the color of non-sunburned skin should be deepened by sunburn or should be lightened.

With respect to the face makeup thickness adjusting process, it is preferable to allow the user to adjust the thickness to any level from a natural makeup level to a somewhat thick makeup level. It is also preferable to allow the user to adjust the makeup thickness level on a portion by portion basis, for example, to adjust the makeup thickness of the eyebrows, the makeup thickness of the periphery of the eyes, the length and makeup thickness of the false eyelashes, or the makeup thickness of the beard.

With respect to the skin tension level adjustment process, it is preferable to allow the user to adjust the skin tension level using a parameter, such as level 1, 2, or the like. Since the skin tension level of the same user varies with the situation such as the time zone or whether before or after exercise, it is preferable to adjust the level in accordance with the situation.

With respect to the facial expression change process, it is preferable to allow the user to stepwise adjust the level of the facial expressions of emotions such as joy, anger, grief and pleasure, for example, so that laughing expressions such as a loud laughing expression and a slight smiling expression are obtained.

By allowing the user to process the skin color, the hair color, eyebrow color, the eye color, or the like in accordance with specification of the user as described above, the user is able to determine whether the processed color matches the clothes and thus whether the clothes become the user.

A display unit 112 performs a display process on the basis of the generated data for display. Specifically, the display unit 112 displays the three-dimensional shape of the state in which the mannequin is wearing the clothes, on the basis of the wearing 3D data generated by the wearing 3D generator 111. If the wearing 3D data is data to be displayed in a VR environment or an AR environment, or data to be displayed as a 3D hologram, the display unit 112 displays the three-dimensional shape in a virtual space or a real space, or on the display or the like of the real store terminal 12 or user terminal 13 in accordance with a corresponding display technology. Thus, the three-dimensional shape whose portion has been processed into the appearance desired by the user and that represents the state in which the mannequin is wearing the clothes is displayed.

If background combined data is generated by a background combination unit 113 (to be discussed later), a background combined image in which a background is combined with the three-dimensional shape of the state in which the mannequin is wearing the clothes is displayed on the basis of the background combined data.

The background combination unit 113 performs a "background combination process" of generating background combined data used to display a background combined image in which a background is combined with the three-dimensional shape of the state in which the mannequin is wearing the clothes, on the basis of specification of the user. Thus, the display unit 112 is able to display a state in which the mannequin wearing the clothes is taking some pose against the background, on the basis of the background combined data.

Examples of the type of "background" include backgrounds in which an animal is displayed, backgrounds in which a human is displayed, backgrounds representing scenes, and backgrounds representing seasons.

Examples of the scenes include theatergoing, graduation ceremony, mountain climbing, coast, drive, marathon, cherry blossom viewing, and walk.

Examples of the backgrounds representing seasons include backgrounds in which blooming cherry blossom trees are displayed, backgrounds in which sunflowers are blooming and dragonflies are flying, backgrounds in which autumn colored trees are displayed, and backgrounds a forest buried in snow is displayed.

If AI determination as to what background should be used is specified by the user, the background combination unit 113 combines a background representing a scene that has been determined to have a predetermined level of matching by AI, with the three-dimensional shape of the state in which the mannequin is wearing the clothes.

For example, if the clothes are sportswear, scenes such as marathon, mountain climbing, and walk fit the clothes and are determined to have a high level of matching by AI. For this reason, the background combination unit 113 combines a background representing a scene such as marathon, mountain climbing, and walk with the three-dimensional shape of the state in which the mannequin is wearing the sportswear.

By combining the background with the three-dimensional shape of the state in which the mannequin is wearing the clothes and displaying the combination as described above, the user is able to determine whether the clothes worn by the mannequin become the user in the predetermined scene or season.

As one example use method, the user may select clothes suitable for a season or scene by switching between clothes suitable for backgrounds or scenes in mid-summer and clothes suitable for backgrounds or scenes in mid-winter and displaying each combination. Also, when going to sports watching, the user may select clothes suitable for scenes of sports such as rugby or football. In the case of a business scene, the user may select clothes while making comparisons between clothes suitable for formal scenes and clothes suitable for somewhat casual scenes. When going for a walk with a certain breed of dog, the display system 1 helps the user determine what clothes are suitable for a walk with the dog. The user may also select suitable clothes while displaying one or more group users or animals other than the user. For example, the user may determine whether matching clothes become the user and a person next to the user by displaying the matching clothes. The group may be a four-member group or 11-member team.

Figure 3:
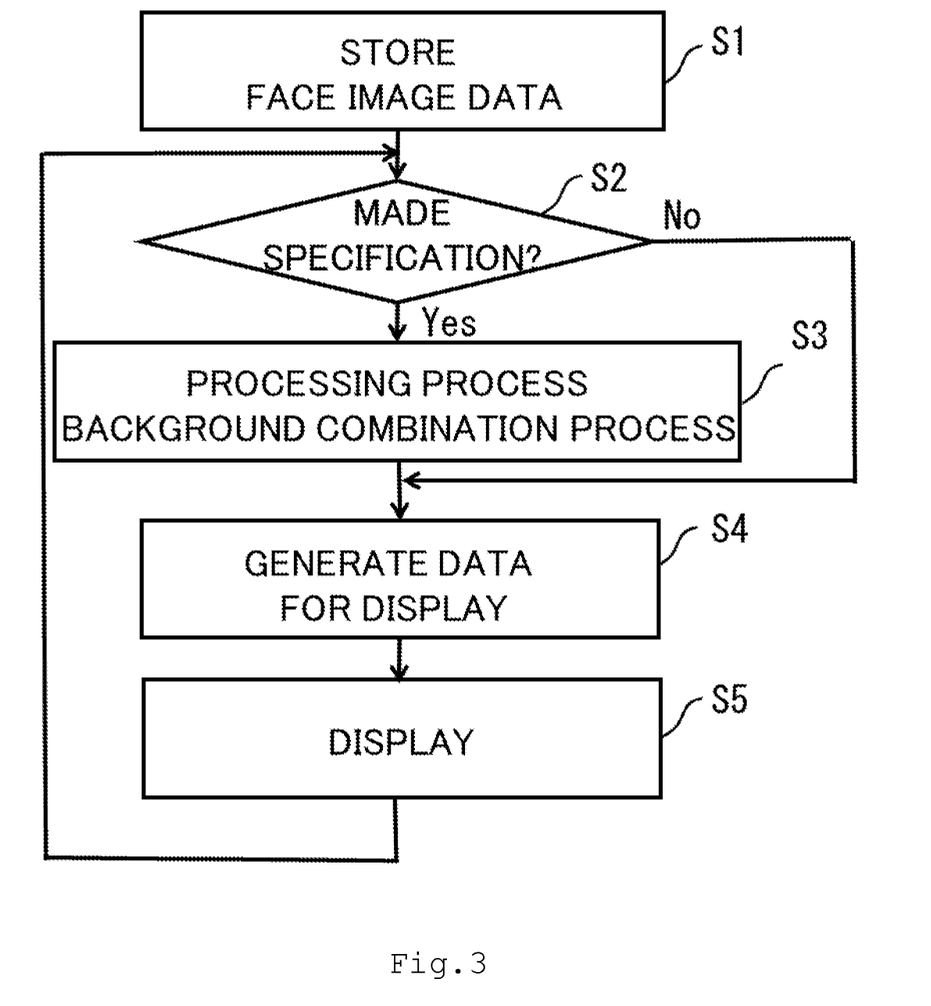
FIG. 3 is a flowchart showing process steps performed by the display system according to the embodiment.

Next, referring to a flowchart shown in FIG. 3, process steps performed by the display system 1 will be described. The user previously takes a user's face image using a digital camera or the like and saves data on the user's face image.

The user registers themself as a member for using the display system 1 by operating the user terminal 13. At this time, the user's face image data is incorporated into the user terminal 13, which then transmits the image data to the control node 11 so that the image data is stored in the storage device of the control node 11 (step S1).

Next, the user operates the user terminal 13 to make an instruction to display a mannequin that is close to the body shape of the user and is wearing clothes. Thus, the control node 11 of the display system 1 analyzes details of the instruction of the user (step S2). Specifically, the control node 11 determines whether the user has specified the body shape of a mannequin, the type of clothes, replacement of the face of the mannequin, processing of a portion of the mannequin or clothes, combination of a background, or the like.

If the user has made some specification (step S2: YES), the control node 11 selects a mannequin and clothes specified by the user, processes a portion specified by the user into a specified appearance (step S3), and then generates data for display (step S4). Specifically, if the user has specified processing of a portion of the face of the mannequin or the clothes, the wearing 3D generator 111 performs a processing process of processing the specified portion and then generates wearing 3D data representing a three-dimensional shape of a state in which the mannequin is wearing the clothes. If the user has specified combination of a particular background, the background combination unit 113 performs a background combination process of generating background combined data used to display a background combined image in which the particular background is combined with the three-dimensional shape of the state in which the mannequin is wearing the clothes.

On the other hand, if the user has not made any specification (step S2: NO), the control node 11 skips the step S3 (the processing process and the background combination process), combines a mannequin and clothes using mannequin data and clothes data previously stored in the storage device, and generates wearing 3D data representing a three-dimensional shape of a state in which the mannequin is wearing the clothes (step S4).

The display unit 112 displays the three-dimensional shape of the state in which the mannequin is wearing the clothes or the background combined image in which the background is combined with the three-dimensional shape, on the basis of the data for display generated in the step S4 (step S5).

As described above, the display system 1 according to the embodiment of the present invention is able to process the three-dimensional shape of the state in which the mannequin is wearing the clothes, into the appearance desired by the user and to display the processed three-dimensional shape. The display system 1 is also able to generate the wearing 3D data in which the face of the mannequin is replaced with the face of the user. Thus, even if the user does not actually try on the clothes, the display system 1 is able to display the three-dimensional shape as if the user were trying on the clothes, allowing the user to check if the user is wearing the clothes well. Also, performing the blurring process reduces reality and prevents the mannequin from looking like a real human and thus giving an eerie impression. Also, even if the user is not present in a predetermined situation, the user is able to check if the user is wearing the clothes well in the predetermined situation. Also, for example, the user is able to check how the complexion of the user is changed when the user becomes sunburned, or how the face of the user looks like when the user becomes somewhat thin or fat, or how the mood is changed when the makeup is somewhat thickened.

The above embodiment is only illustrative, and the present invention can also be carried out by making various modifications to the embodiment without departing from the spirit and scope of the invention as set forth in the claims.

For example, with respect to the replacement process, the user may be allowed to replace not only the face but also the hair, arms, or the like. For example, only the hair may be replaced with different hair, or only muscles may be added to the arms. Or, only the face may be replaced with the face of another person or a character.

The communication scheme of the display system 1 is not limited to the blockchain network 20 according to the above embodiment and may be, for example, pier-to-pier (P2P) or client-server communication, communication using a distributed storage blockchain, or a combination thereof.

While, in the above embodiment, the display system 1 has been described as including the multiple nodes 10, the device configuration of the display system 1 is not limiting. For example, the display system 1 may consist of a single device or a client-server system. If the display system 1 consists of a single device, this device may be a stand-alone device, which is not connected to a network such as the Internet.

Clothes sold through the display system 1 according to the present invention are not limited to clothes that the user can actually wear and may be digital clothes. A user who has purchased digital clothes may view them for decorative purposes, may put them on a character in a computer game, movie, or the like, or may put them on a character serving as a user's avatar that makes communication on the Internet or in a local computer environment that is not connected to the Internet, or may use them to make actual clothes. Clothes may be sold through IoT rather than EC sites.

What is claimed is:
1. A display system for selling clothes, comprising:
   a control node and at least one user terminal node connected to said control node through a communication channel, wherein said control node is a computer configured with a CPU, a storage device, a communication interface, and input/output interface, wherein said storage device includes data and programs stored therein, said data including at least previously generated data on 3D shapes of a plurality of mannequins, previously inputted data on clothes and properties of clothes sold in at least one real store, and data on face images and use histories of users of the display system, and wherein the programs include at least a program for representing a mannequin and clothes in 3D shape using computer graphics, wherein said control node includes a wearing 3D generator and a display unit operatively coupled to said wearing 3D generator, wherein said at least one user terminal node is configured to:
  upon a user's registration by operating the at least one user terminal node, incorporate a user's face image data into said at least one user terminal node and transmit said user's face image therefrom to said storage device in said control node, and
  upon authentication of the user, be operated by the user to transmit user's instructions to said control node, said instructions selecting a body shape of a mannequin, type of clothes, a portion of the mannequin's body, and a processing of the selected portion, said instructions for processing of the selected portion including instructions to replace a face of the mannequin, and a value of a user-adjustable parameter level for said portion, wherein said control node is configured to analyze said instructions and to respond by:
  displaying the mannequin selected from said plurality of mannequins stored in said storage device and clothes of the selected type,
  replacing a face of the selected mannequin body,
  processing said selected portion of the selected mannequin body in accordance with said selected value of the user-adjustable parameter level, and
  generating 3D data in accordance with said instructions for display on said display unit, wherein, said wearing 3D generator is configured to:
  upon generation of said 3D data by said control node, generate and process wearing 3D data representing a three-dimensional shape of a state in which the selected mannequin wears the clothes of the selected type, by combining mannequin 3D data representing the selected mannequin in a three-dimensional shape using computer graphics and clothes 3D data representing the clothes of the selected type in three-dimensional shapes using computer graphics, and
  process said wearing 3D data by changing said selected portion by at least blurring said selected portion in accordance with said selected value of the user-adjustable parameter level,
  upon an adjustment of the value of the user-adjustable parameter level by the user, reprocess said wearing 3D data by further changing said selected portion in accordance with the adjusted value of the user-adjustable parameter level selected by the user; and wherein said display unit is configured to:
  display the three-dimensional shape of the state in which the selected mannequin is wearing the clothes of the selected type, in accordance with the wearing 3D data, and
  upon a reprocessing of said wearing 3D data responsive to the adjustment of the value of the user-adjustable parameter level by the user, display the three-dimensional shape of the state in which the selected mannequin is wearing the clothes of the selected type, in accordance with the reprocessed wearing 3D data.

2. The display system of claim 1, wherein the wearing 3D generator is further configured to generate the wearing 3D data by replacing a face of the mannequin with a face of the user.

3. The display system of claim 2, wherein image data representing the face of the user is inputted when the user is registered or authenticated.

4. The display system of claim 1, wherein the wearing 3D generator is further configured to perform said processing of said selected portion by further performing at least one of a process of changing at least one of skin color, hair color, eyebrow color, and eye color, a process of adjusting thickness of makeup of a face, a process of adjusting the level of skin tension, and a process of changing a facial expression, in accordance with the selected value of the user-adjustable parameter level and the selected processing of the selected portion.

5. The display system of claim 1,
  wherein said control node further includes a background combination unit operatively coupled to said display unit, said background combination unit being configured to generate background combined data used to display a background combined image on said display unit, wherein said background combined image includes a background combined with the three-dimensional shape of the state in which the selected mannequin wears the clothes of the selected type, and
  wherein the display unit is configured to display the background combined in accordance with the background combined data generated by the background combination unit.

6. The display system of claim 5, wherein the background combination unit is configured to process at least one of a background in which an animal is displayed, a background in which a human is displayed, a background representing a scene, and a background representing a season, in accordance with a selection of the user.

7. The display system of claim 5, wherein the background combination unit is configured to process a background representing a scene having a predetermined level of matching determined by AI with the three-dimensional shape of the state in which the selected mannequin wears the clothes of the selected type.

8. The display system of claim 1, wherein the value of the user-adjustable parameter level is selected by the user from a set of enumerated values for a corresponding parameter.

9. A computer program product for displaying a three-dimensional image of a state in which a mannequin wears clothes, the computer program product being recorded as instructions on a non-transitory computer-readable recording medium, the instructions of the computer program product configured to execute on a computer system configured with a control node and at least one user terminal node connected to said control node through a communication channel, said control node comprising a CPU, a storage device, a communication interface, and an input/output interface, the instructions of the computer program product configured to cause the control node to perform the operations of:
  storing data and programs in said storage device of the control node,
    wherein said data includes at least previously generated data on 3D shapes of a plurality of mannequins, previously inputted data on clothes and properties of clothes sold in at least one real store, data on face images and use histories of users of the computer system, and at least one set of enumerated values for a corresponding parameter, and wherein the programs include at least a program for representing a selected mannequin and clothes in 3D shape using computer graphics, configuring said control node with a wearing 3D generator and a display unit operatively coupled to said wearing 3D generator, wherein said at least one user terminal node is configured to:

upon a user's registration by operating the at least one user terminal node, incorporate a user's face image data into said at least one user terminal node and transmit said user's face image therefrom to said storage device in said control node, and upon authentication of the user, be operated by the user to transmit user's instructions to said control node, said instructions selecting a body shape of a mannequin, type of clothes, a portion of the mannequin's body, and a processing of the selected portion, said instructions for processing of the selected portion including instructions to replace a face of the mannequin, and a value of a user-adjustable parameter level for said selected portion, the value selected by the user from the at least one set of enumerated values, configuring said control node to analyze said instructions and to respond by:

displaying the mannequin selected from said plurality of mannequins stored in said storage device and clothes of the selected type, replacing a face of the selected mannequin body, processing said portion of the selected mannequin body in accordance with said selected value of the user-adjustable parameter level, generating 3D data in accordance with said instructions for display on said display unit, configuring said wearing 3D generator to generate wearing 3D data representing a three-dimensional shape of a state in which the selected mannequin wears the clothes of the selected type, by combining mannequin 3D data representing the selected mannequin in a three-dimensional shape using computer graphics and clothes 3D data representing the clothes of the selected type in three-dimensional shapes using computer graphics; and configuring said display unit to display the three-dimensional shape of the state in which the selected mannequin wears the clothes of the selected type in accordance with the wearing 3D data, wherein the wearing 3D generator processes said selected portion of the three-dimensional shape of the state in which the selected mannequin wears the clothes of the selected type into a specified form, by at least blurring said selected portion in accordance with said selected value of the user-adjustable parameter level for said selected portion.

10. A display system for selling clothes, comprising:

a control node and at least one user terminal node connected to said control node through a communication channel, wherein said control node is a computer configured with a CPU, a storage device, a communication interface, and input/output interface, wherein said storage device includes data and programs stored therein, said data including at least previously generated data on 3D shapes of a plurality of mannequins, previously inputted data on clothes and properties of clothes sold in at least one real store, and data on face images and use histories of users of the display system, and wherein the programs include at least a program for representing a mannequin and clothes in 3D shape using computer graphics, wherein said control node includes a wearing 3D generator and a display unit operatively coupled to said wearing 3D generator, wherein said at least one user terminal node is configured to:

upon a user's registration by operating the at least one user terminal node, incorporate a user's face image data into said at least one user terminal node and transmit said user's face image therefrom to said storage device in said control node, and upon authentication of the user, be operated by the user to transmit user's instructions to said control node, said instructions selecting a body shape of a mannequin, a type of clothes, and a processing of a portion of the mannequin's body, said instructions for processing of the portion including instructions to replace a face of the mannequin, and a changing parameter level for said portion, wherein the control node is configured to analyze said instructions and to respond by:

displaying the mannequin selected from said plurality of mannequins stored in said storage device and clothes specified by the user, processing said portion of the selected mannequin body including replacing a face, and generating 3D data in accordance with said instructions for display on said display unit, wherein, said wearing 3D generator is configured to:

upon generation of said 3D data by said control node, generate and process wearing 3D data representing a three-dimensional shape of a state in which the selected mannequin wears clothes specified by the user, by combining the selected mannequin 3D data representing the selected mannequin in a three-dimensional shape using computer graphics and the clothes 3D data representing the clothes specified by the user in three-dimensional shapes using computer graphics, and process said wearing 3D data by blurring said portion specified by the user in accordance with the changing parameter level specified by the user; and wherein said display unit is configured to display the three-dimensional shape of the state in which the selected mannequin is wearing the clothes specified by the user, in accordance with the wearing 3D data.

* * * * *